US012711118B2

(12) United States Patent
Son et al.

(10) Patent No.: US 12,711,118 B2

(45) Date of Patent: Aug. 18, 2026

(54) METHOD, DEVICE, AND COMPUTER PROGRAM FOR ACCELERATING VECTOR INDEXING BY USING PROCESSING-IN-MEMORY (PIM)

(71) Applicant: SAMSUNG SDS CO., LTD., Seoul (KR)

(72) Inventors: Jimyoung Son, Seoul (KR); Daehyeon Baek, Seoul (KR); Hyojung Lee, Seoul (KR); Jieun Choi, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 19/169,520

(22) Filed: Apr. 3, 2025

(65) Prior Publication Data

US 2025/0335411 A1 Oct. 30, 2025

(30) Foreign Application Priority Data

Apr. 25, 2024 (KR) ........................ 10-2024-0055203
Sep. 27, 2024 (KR) ........................ 10-2024-0132042

(51) Int. Cl.
*G06F 16/00* (2019.01)
*G06F 16/22* (2019.01)

(52) U.S. Cl.
CPC ................................ *G06F 16/2237* (2019.01)

(58) Field of Classification Search
CPC .... G06F 3/0673; G06F 3/0659; G06F 3/0613; G06F 15/7821; G06F 13/28; G06F 3/0679; G06F 13/1657; G06F 3/0604; G06F 9/5016; G06F 16/2237; G06F 16/2255; G06F 16/2453; G06F 40/30; G06F 16/3347; G06F 16/906; G06F 16/2462; G06F 16/9032; G06F 16/84; G06F 16/9038; G06F 16/958; G06F 16/2438; G06F 16/24554; G06N 3/063; G06N 3/045; G06N 3/09; G06N 7/00
See application file for complete search history.

(56) References Cited

U.S. PATENT DOCUMENTS 11,574,020 B1 * 2/2023 Zhai .................... G06F 16/3347
11,755,898 B1 * 9/2023 Rhee ...................... G06N 3/063 718/104
12,130,790 B1 * 10/2024 Al-Qurishi .............. G06F 16/93
2023/0400985 A1 * 12/2023 Kim ...................... G06F 3/0673
2025/0259085 A1 * 8/2025 Crabtree ................ G06N 5/043

FOREIGN PATENT DOCUMENTS

KR 10-2023-0169684 A 12/2023

* cited by examiner

*Primary Examiner* — Yicun Wu
(74) *Attorney, Agent, or Firm* — NSIP Law

(57) ABSTRACT

The present disclosure relates to a method, a device, and a computer program for accelerating vector indexing by using PIM. The present disclosure presents a method for accelerating vector indexing by using PIM, the method including: receiving at least one embedding vector and at least one piece of tenant information; mapping a tenant area determined by the tenant information to a sheet; obtaining a first projected vector by performing, based on the sheet, a projection operation on the embedding vector; comparing the similarity between the first projected vector and at least one bucket, based on the sheet; and selecting, based on the similarity comparison result, at least one second projected vector having relatively high similarity to the first projected vector within the bucket.

20 Claims, 10 Drawing Sheets

Fig. 1

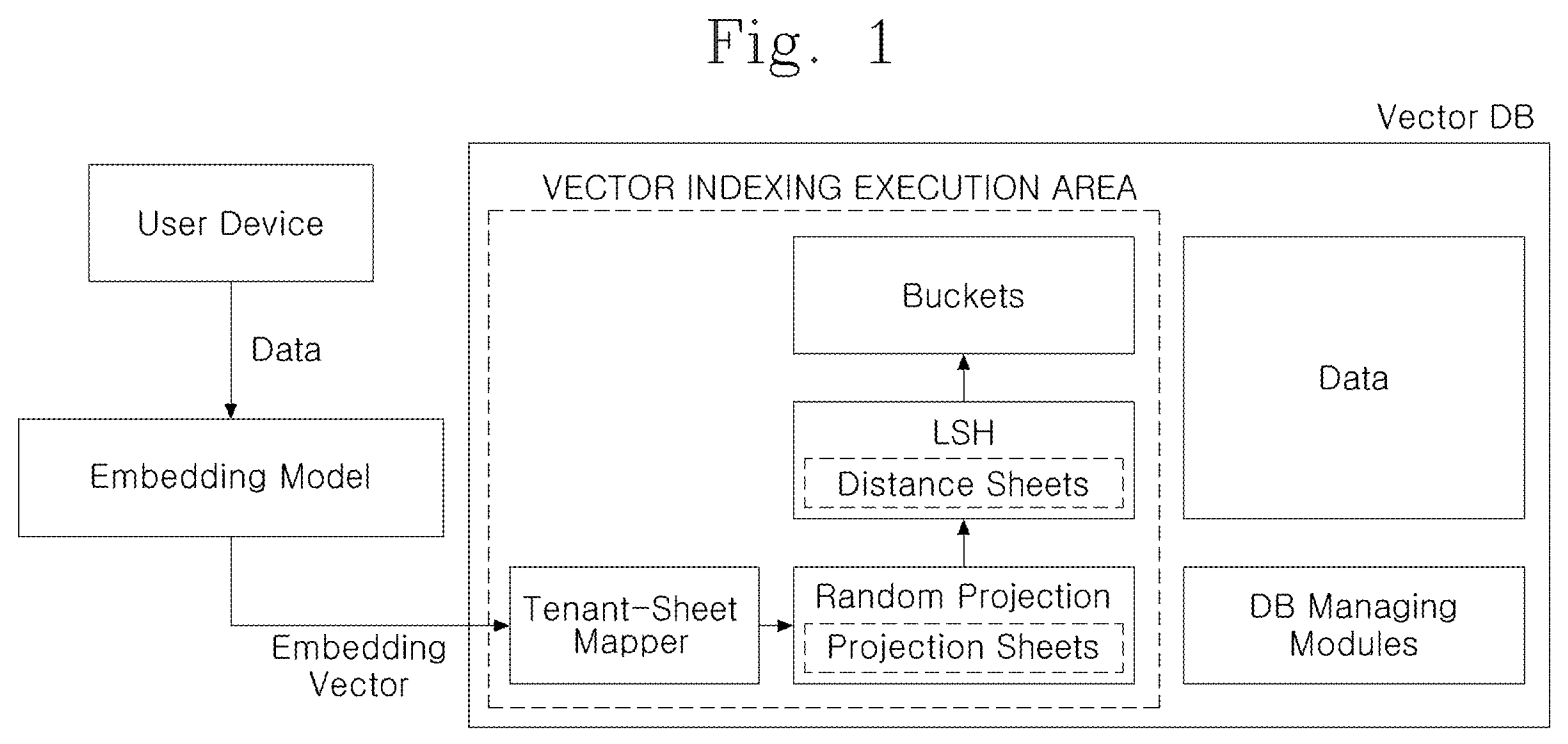

Vector DB

Data

DB Managing Modules

VECTOR INDEXING EXECUTION AREA

Buckets

LSH

Distance Sheets

Random Projection

Projection Sheets

Tenant-Sheet Mapper

User Device

Data

Embedding Model

Embedding Vector

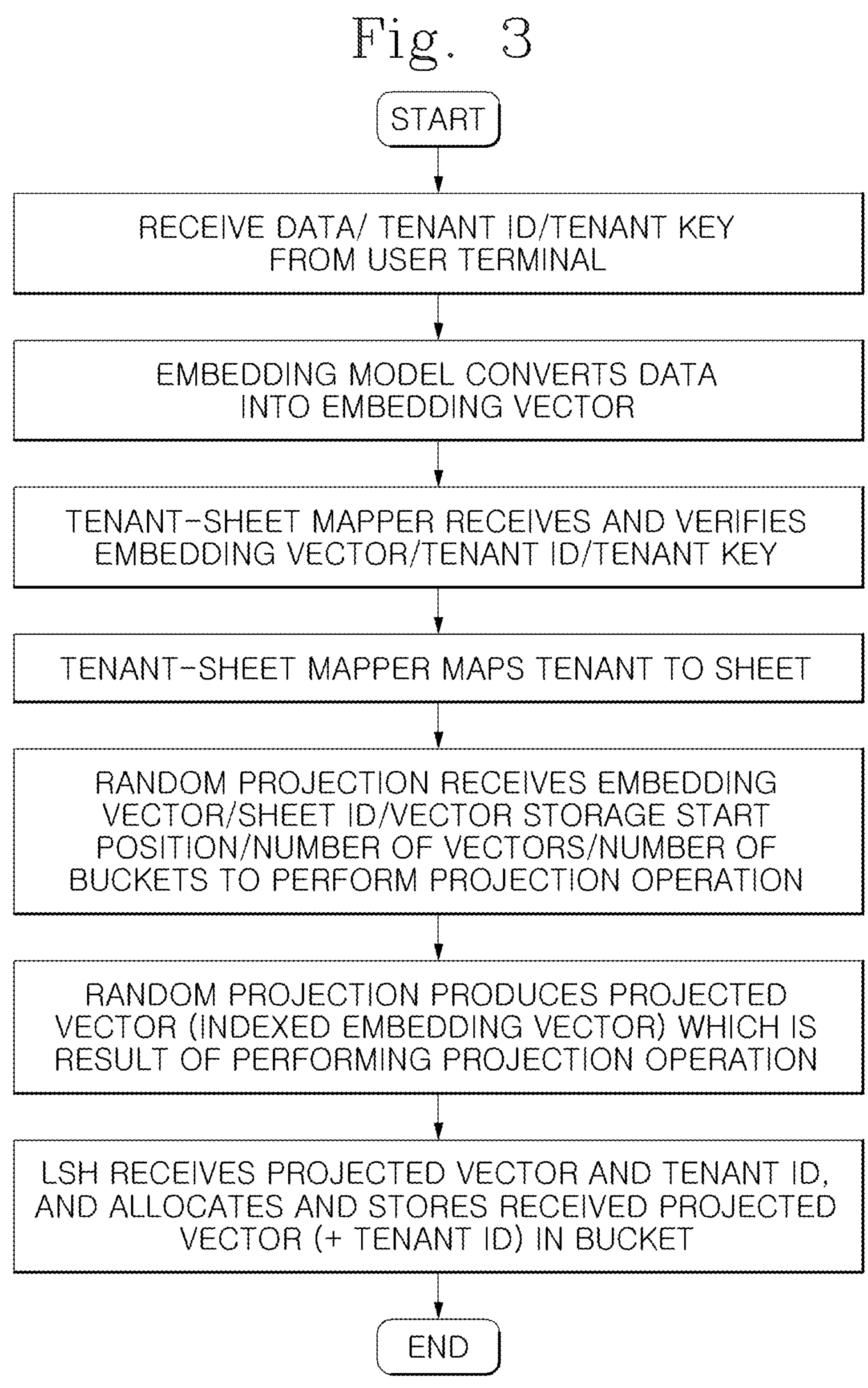
Fig. 3
START
RECEIVE DATA/ TENANT ID/TENANT KEY FROM USER TERMINAL
EMBEDDING MODEL CONVERTS DATA INTO EMBEDDING VECTOR
TENANT-SHEET MAPPER RECEIVES AND VERIFIES EMBEDDING VECTOR/TENANT ID/TENANT KEY
TENANT-SHEET MAPPER MAPS TENANT TO SHEET
RANDOM PROJECTION RECEIVES EMBEDDING VECTOR/SHEET ID/VECTOR STORAGE START POSITION/NUMBER OF VECTORS/NUMBER OF BUCKETS TO PERFORM PROJECTION OPERATION
RANDOM PROJECTION PRODUCES PROJECTED VECTOR (INDEXED EMBEDDING VECTOR) WHICH IS RESULT OF PERFORMING PROJECTION OPERATION
LSH RECEIVES PROJECTED VECTOR AND TENANT ID, AND ALLOCATES AND STORES RECEIVED PROJECTED VECTOR (+ TENANT ID) IN BUCKET
END User Device
Embedding Model
Tenent-Sheet Mapper
Random Projection
LSH&Bucket
Data
Tenant Id, Key
Embedding Vector
sheet_id, loc,
Embedding Vector
Projected Vector

Fig. 5

METHOD, DEVICE, AND COMPUTER PROGRAM FOR ACCELERATING VECTOR INDEXING BY USING PROCESSING-IN-MEMORY (PIM)

CROSS-REFERENCE TO RELATED APPLICATION(S)

This application is based on and claims priority under 35 U.S.C. 119 to Korean Patent Application No. 10-2024-0055203, filed on Apr. 25, 2024 and Korean Patent Application No. 10-2024-0132042, filed on Sep. 27, 2024, in the Korean Intellectual Property Office, the disclosure of which is herein incorporated by reference in its entirety.

BACKGROUND OF THE INVENTION

1. Field of the Invention

The present disclosure relates to a method, a device, and a computer program for accelerating vector indexing by using PIM and, more specifically, to a method, a device, and a computer program for accelerating vector indexing in a vector DB by using PIM.

2. Description of the Prior Art

Processing-in-memory (PIM) architecture was proposed as early as the 1960s, but due to the limitations and restrictions of memory technology at the time, it was very difficult to actually implement PIM-related logic inside or near a memory. Implementation of the PIM architecture has only recently been realized since the PIM architecture began to be physically implemented in the form of FPGAs or ASICs in 2020 or later. Due to this slow implementation and research, discussions on the use of PIM in a vector DB are still very limited.

Vector indexing is a factor directly related to the performance of a vector DB, and access control, multitenancy, backup/recovery, and scalability for data must be considered in an integrated manner in accordance with the service characteristics of the DB.

Vector indexing refers to making a type of index that allows for quickly finding embedding vectors stored in a vector DB. The task of comparing a large amount of vector data and query vectors one by one is disadvantageous in terms of latency. Therefore, an approximate search method such as embedding vector compression is used (typically, a method in which random projection and locality-sensitive hashing (LSH) are combined is used).

PIM is advantageous for operations that require frequent memory access, but has a problem that the memory layout of data may vary depending on the operation because a processor is in a memory. Therefore, it is necessary to properly present i) a method for using PIM in a vector indexing operation, ii) a method for multitenancy and access control suitable for PIM, and iii) a method for improving performance for multiple queries. Currently, operations associated with random projection and a similarity measure are mostly processed by a processor, such as a CPU or a GPU. However, since these operations mostly involve computations between several query vectors and hundreds of thousands of vectors or more, it may be ideal to use memory-centric PIM, which is advantageous for matrix-vector multiplication (GEMV). Nevertheless, a method for using PIM in vector DBs has barely been discussed.

SUMMARY OF THE INVENTION

The present disclosure has been made to solve the problems of the prior art described above, and an aspect of the present disclosure is to provide a method, a device, and a computer program for accelerating vector indexing by using PIM.

In addition, an aspect of the present disclosure is to provide a method, a device, and a computer program for accelerating vector indexing in a vector DB by using PIM.

In addition, an aspect of the present disclosure is to provide a method, a device, and a computer program for accelerating vector indexing in a vector DB by controlling access to data by using PIM.

In addition, an aspect of the present disclosure is to provide a method, a device, and a computer program for accelerating vector indexing in a vector DB by implementing multitenancy for data by using PIM.

In addition, an aspect of the present disclosure is to provide a method, a device, and a computer program for accelerating vector indexing in a vector DB by implementing backup/recovery of data by using PIM.

In addition, an aspect of the present disclosure is to provide a method, a device, and a computer program for accelerating vector indexing in a vector DB by implementing scalability for data by using PIM.

In addition, an aspect of the present disclosure is to provide a method, a device, and a computer program for accelerating vector indexing in a vector DB for multiple queries by using PIM.

The technical problems to be solved in the present disclosure are not limited to the technical problems mentioned above, and other technical problems not mentioned will be clearly understood by those skilled in the art to which the present disclosure belongs from the description in this specification.

According to a first aspect of the present disclosure, a method for accelerating vector indexing by using PIM may include: receiving at least one embedding vector and at least one piece of tenant information; mapping a tenant area determined by the tenant information to a sheet; obtaining a first projected vector by performing, based on the sheet, a projection operation on the embedding vector; comparing similarity between the first projected vector and at least one bucket, based on the sheet; and selecting, based on the similarity comparison result, at least one second projected vector having relatively high similarity to the first projected vector within the bucket.

The tenant information may include at least one of a tenant ID and a tenant key.

The sheet may be a projection sheet or a distance sheet.

The projection sheet may be formed as a unit in which a memory area is divided into a predetermined number of memory channels, the projection sheet includes a predetermined number of tenant areas, and each tenant area may include a predetermined number of projection vectors.

The projection vectors may be operands configured to reduce a dimension or complexity of the embedding vector through the projection operation.

The distance sheet may be formed as a unit in which a memory area is divided into a predetermined number of memory channels, may be allocated to each tenant, and may include at least one second projected vector for each of the at least one bucket.

The first projected vector may be an operation result vector in which the dimension or complexity of the embedding vector has been reduced through the projection operation, and the second projected vector may be an operation result vector in which the dimension or complexity of the embedding vector has been reduced, and may be a vector stored in each bucket.

The bucket may be formed by branching a projected vector through an LSH module.

In addition, the selecting of the second projected vector may include selecting the at least one second projected vector having high similarity to the first projected vector within the bucket in case that there is a bucket matching the first projected vector as a result of the similarity comparison.

Furthermore, the selecting of the second projected vector may include selecting a bucket having highest similarity from among the at least one bucket in case that there is no bucket matching the first projected vector as a result of the similarity comparison, and selecting the at least one second projected vector having high similarity to the first projected vector within the selected bucket.

A second aspect of the present disclosure may relate to a computer program stored in a medium to execute, in combination with hardware, the method for accelerating vector indexing by using PIM.

According to a third aspect of the present disclosure, a device for accelerating vector indexing by using PIM may include a processor, wherein the processor is configured to: receive at least one embedding vector and at least one piece of tenant information; map a tenant area determined by the tenant information to a sheet; obtain a first projected vector by performing, based on the sheet, a projection operation on the embedding vector; compare, based on the sheet, similarity between the first projected vector and at least one bucket; and select, based on the similarity comparison result, at least one second projected vector having relatively high similarity to the first projected vector within the bucket.

The tenant information may include at least one of a tenant ID and a tenant key.

The sheet may be a projection sheet or a distance sheet.

The projection sheet may be formed as a unit in which a memory area is divided into a predetermined number of memory channels, the projection sheet may include a predetermined number of tenant areas, and each tenant area may include a predetermined number of projection vectors.

The projection vectors may be operands configured to reduce a dimension or complexity of the embedding vector through the projection operation.

The distance sheet may be formed as a unit in which a memory area is divided into a predetermined number of memory channels, may be allocated to each tenant, and may include at least one second projected vector for each of the at least one bucket.

The first projected vector may be an operation result vector in which the dimension or complexity of the embedding vector has been reduced through the projection operation, and the second projected vector may be an operation result vector in which the dimension or complexity of the embedding vector has been reduced, and may be a vector stored in each bucket.

The bucket may be formed by branching a projected vector through an LSH module.

Furthermore, the selecting of the second projected vector may include selecting the at least one second projected vector having high similarity to the first projected vector within the bucket in case that there is a bucket matching the first projected vector as a result of the similarity comparison.

Furthermore, the selecting of the second projected vector may include selecting a bucket having highest similarity from among the at least one bucket in case that there is no bucket matching the first projected vector as a result of the similarity comparison, and selecting the at least one second projected vector having high similarity to the first projected vector within the selected bucket.

Accordingly, according to an embodiment of the present disclosure, the method, the device, and the computer program for accelerating vector indexing by using PIM may accelerate vector indexing in a vector DB by using PIM.

In addition, according to an embodiment of the present disclosure, the method, the device, and the computer program for accelerating vector indexing by using PIM may accelerate vector indexing in a vector DB by controlling access to data by using PIM.

In addition, according to an embodiment of the present disclosure, the method, the device, and the computer program for accelerating vector indexing by using PIM may accelerate vector indexing in a vector DB by implementing multitenancy for data by using PIM.

In addition, according to an embodiment of the present disclosure, the method, the device, and the computer program for accelerating vector indexing by using PIM may accelerate vector indexing in a vector DB by implementing backup/recovery of data by using PIM.

In addition, according to an embodiment of the present disclosure, the method, the device, and the computer program for accelerating vector indexing by using PIM may accelerate vector indexing in a vector DB by implementing scalability for data by using PIM.

In addition, according to an embodiment of the present disclosure, the method, the device, and the computer program for accelerating vector indexing by using PIM may accelerate vector indexing in a vector DB for multiple queries by using PIM.

The effects that can be obtained from the present disclosure are not limited to the effects mentioned above, and other effects not mentioned will be clearly understood by those skilled in the art to which the present disclosure belongs from the description of this specification.

BRIEF DESCRIPTION OF THE DRAWINGS

The accompanying drawings, which are included as part of the detailed description in order to help understand the present disclosure, provide an embodiment of the present disclosure and illustrate the technical idea of the present disclosure along with the detailed description.

FIG. 1 is a schematic diagram illustrating a vector DB that performs vector indexing using processing-in-memory (PIM) according to an embodiment of the present disclosure;

FIG. 3 is a flowchart illustrating a method for storing an embedding vector for vector indexing according to an embodiment of the present disclosure.

FIG. 5 is a flowchart illustrating a method for obtaining an embedding vector by vector indexing according to an embodiment of the present disclosure.

DETAILED DESCRIPTION OF THE EXEMPLARY EMBODIMENTS

Figure 2A:
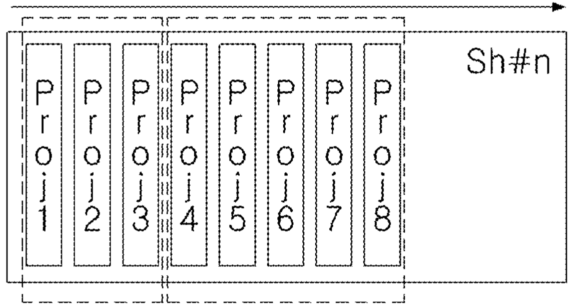
FIGS. 2A, 2B and 2C illustrate the structure of a sheet, a projection sheet, and a distance sheet according to an embodiment of the present disclosure, respectively.

Hereinafter, the embodiments disclosed in the present specification will be described in detail with reference to the accompanying drawings. The aspects, specific advantages, and novel features of the present disclosure will become apparent from the following detailed description and preferred embodiments associated with the accompanying drawings.

The terms and words used in the present specification and in the claims are defined appropriately by the inventor to best describe the disclosure and should be construed as meanings or concepts consistent with the technical idea of the present disclosure. The terms and words are merely provided to describe embodiments and should not be construed as limiting the present disclosure.

In assigning reference numerals to components, identical or similar components are assigned the same reference numerals regardless of the reference numerals, and redundant descriptions thereof will be omitted. The suffixes "module" and "unit" for components, used in the following description, are given or used interchangeably for ease of drafting the specification, do not inherently have distinct meanings or roles, and may refer to either software or hardware components.

In describing the components of the present disclosure, when a component is expressed in the singular form, it is to be understood that the component also includes the plural form unless otherwise specifically stated. Furthermore, the terms "first," "second," and the like are used to distinguish one component from another, and the components are not limited by the terms. Furthermore, when a component is connected to another component, it is intended that another component may be connected between the component and the other component.

Furthermore, in describing embodiments disclosed in the present specification, detailed descriptions of related well-known technologies may be omitted when the detailed descriptions are considered to obscure the essence of the embodiments disclosed in the present specification. Furthermore, the accompanying drawings are provided only to facilitate understanding of the embodiments disclosed in the present specification, and it is to be understood that the technical idea disclosed in the present specification is not limited by the accompanying drawings and include all modifications, equivalents, or substitutions that are within the scope of the idea and technology of the present disclosure.

Hereinafter, exemplary embodiments of a method, a device, and a computer program for accelerating vector indexing by using PIM according to the present disclosure will be described in detail with reference to the accompanying drawings.

FIG. 1 is a schematic diagram illustrating a vector DB that performs vector indexing using processing-in-memory (PIM) according to an embodiment of the present disclosure.

A vector indexing method according to an embodiment of the present disclosure has the following features: (1) vector indexing through sheet-level management of PIM; (2) multitenancy and access control through a tenant-sheet mapper; and (3) multi-query response on PIM.

The vector indexing method according to an embodiment of the present disclosure will be described in detail with reference to FIG. 1.

FIG. 1 is a schematic diagram briefly illustrating a vector DB that performs vector indexing using random projection and locality-sensitive hashing (LSH). An embedding model converts unstructured data such as images and text into vectors. In other words, the embedding model converts input data into an embedding vector, and the embedding vector is stored in the vector DB. The part shown by the dotted line in FIG. 1 corresponds to a vector indexing execution area. When the embedding vector is input into the vector indexing execution area, an indexed embedding vector (or a projected vector) including 1s or 0s is produced through a random projection module, and the produced projected vector is branched into specific buckets through an LSH module, which is a set of hash functions. Each bucket stores information such as the produced projected vector, the embedding vector, or data order information, and offset. The random projection module produces the projected vector through the dot product, which is an operation that is easy to process in PIM.

In the Random Projection module, a projection operation (GEMV operation) is performed on the input embedding vector to obtain a projected vector (an indexed embedding vector including 1s or 0s). This process may be briefly expressed as follows.

$$y=Ax$$

Here, y is a result value (projected vector), A is a set (matrix) of projection vectors, and x is the embedding vector. This projection operation reduces the dimension or complexity of an existing embedding vector.

The projection vector may be a random vector or a user-specified vector (in a normal random projection module, the projection vector refers to a vector with random components that follow a normal distribution). These projection vectors gather to form a matrix, and function as operands that produce a new vector (y in the above equation) through the GEMV operation (Ax operation in the above equation) with the embedding vector. For example, when a GEMV operation is performed on an embedding vector with dimension [1,1024] and N projection vectors with dimension [N, 1024], the result may be simplified to a vector with dimension [1, N] (a simplified vector (a projected vector) is obtained through the GMV operation).

Figure 2B:
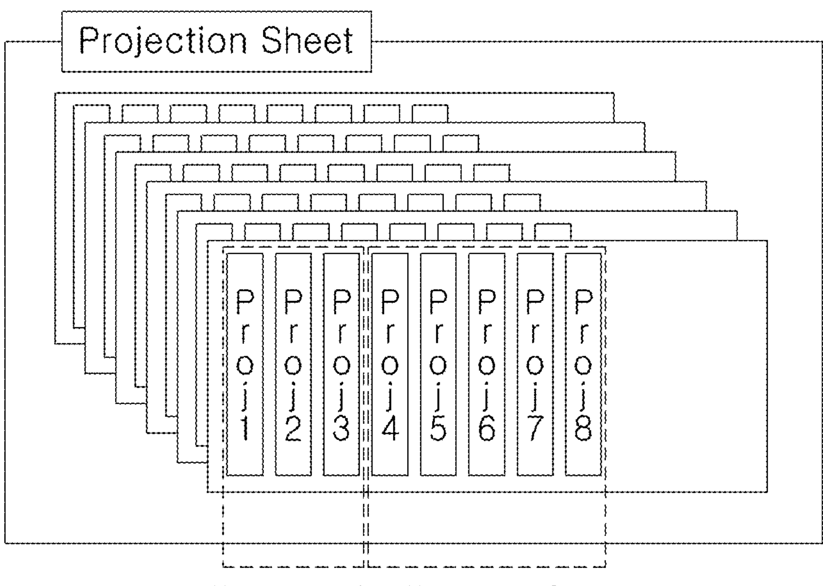
Figure 2C:
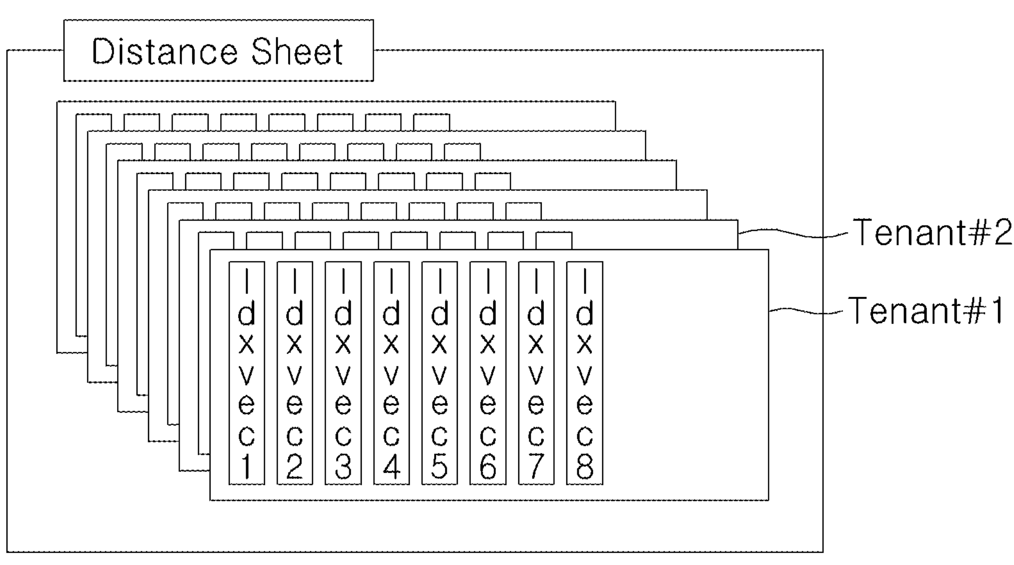

FIGS. 2A, 2B and 2C illustrate the structure of a sheet, a projection sheet, and a distance sheet according to an embodiment of the present disclosure, respectively.

When a matrix of PIM GEMV operations is defined as in-memory weights and a vector is defined as an input, a weight matrix may divide the memory in a direction in which the parallelism of memory banks is maximized (a bank-wise direction), as shown in FIG. 2A. For vector indexing through sheet-unit management of PIM (feature 1), a predetermined number of channels in a memory area are grouped into units called "sheets", and within each sheet, the weight matrices are accumulated and stored one by one in the parallelism maximization direction (bank-wise direction). Referring to FIG. 2A, memory channels may be grouped into n sheets (Sh #1-Sh #n), each sheet may include a predetermined number (e.g., m) of tenant areas (Tenant

#1-Tenant #m), each tenant area may include a predetermined number (l) of projection vectors (Proj1-Projl). In the present disclosure, a tenant refers to an entity that has an isolated space allocated in a memory or a DB, a vector/data storage space in the tenant is specified by a tenant ID, and authority for the storage space is verified by a tenant key.

Here, sheet spaces for the projection operation of a random projection module and the distance operation (such as Hamming Distance) of an LSH module are defined and pre-allocated, and the sheet spaces are defined as projection sheets and distance sheets, respectively. First, in the case of projection sheets, the number of projection vectors stored may be viewed as a constant that is predetermined for each tenant (in FIG. 2B, the number of projection vectors is set 3 in Tenant #1 and 5 in Tenant #2). A tenant-sheet mapper has tenant information (a tenant ID or a tenant key) and information about a sheet number, the starting position of projection vectors, and the number of projection vectors. With respect to a newly incoming embedding vector as a query, a PIM GEMV operation is performed based on the sheet (projection sheet) identified and defined as described above in the tenant-sheet mapper. The utilization of PIM may be maximized by pre-storing the projection vectors to be used for the projection operation in a memory layout (a projection sheet structure) that is suitable for the GEMV operation.

Buckets are formed by branching projected vectors through the LSH module. Each bucket has a bucket ID, which is a representative value (representative vector value) that indicates the bucket. When a projected vector (indexed embedding vector) of a newly incoming query has the same vector value as the bucket ID of a bucket (when the projected vector matches the bucket), projected vectors having top-k similarity (k projected vectors having the highest similarity) within the bucket (within the matched bucket) are calculated (in this case, distance sheets are used). When a bucket to which the projected vector of the newly incoming query is to be directly matched is not found, a process is required to select a bucket, which is closest (most similar) to the projected vector, through a distance operation such as Hamming distance (multiple buckets (j) closest to the projected vector may be selected), and an additional process may be required to calculate projected vectors having top-k similarity (the k projected vectors having the highest similarity) within the same bucket (within a bucket having high similarity) (in this case, distance sheets are used).

Distance sheets are allocated to respective tenants on a per-sheet basis, accumulate and store the indexed embedding vectors (Idxvec 1, Idxvec 2, Idxvec 3, . . . ) for each bucket (see FIG. 2C), and enable obtaining the distance between a query's indexed embedding vector and each bucket through the PIM operation (however, this is limited to the definition of a distance that can be implemented by a kernel in a PIM processor, and when there is no distance definition, the operation through distance sheets may be excluded). In FIG. 2C, the indexed embedding vectors (Idxvec 1, Idxvec 2, Idxvec 3, . . . ) for each bucket may be referred to as the bucket ID of each bucket.

In relation to multitenancy and access control through the tenant-sheet mapper (feature 2), the tenant-sheet mapper has the tenant information (a tenant ID or a tenant key), a sheet number, the starting position of projection vectors, and the number of projection vectors. The tenant-sheet mapper manages the projection operation of the random projection module and the distance operation of the LSH module so that the operations are performed on an area on a sheet that is dependent on a tenant in PIM (multitenancy management). In terms of access control, tenant verification may first be performed outside a vector indexing execution area, and additionally, within the vector indexing execution area, a key may be allocated to each tenant so that the tenant-sheet mapper can verify the tenant by using the key-pair. In addition, a bucket is configured so that a hash function of the LSH module receives the tenant ID and the indexed embedding vector as inputs, and the generation of the bucket itself is also strictly separated for each tenant, thereby ensuring that the information is not mixed between tenant (access control). In addition, for backup/recovery, the PIM may simply copy a portion in a memory to a persistence storage, and by abstracting a memory area, which is referred to as a sheet where the PIM operation is performed, expansion within the limits allowed by a PIM memory device is also possible.

Figure 4:
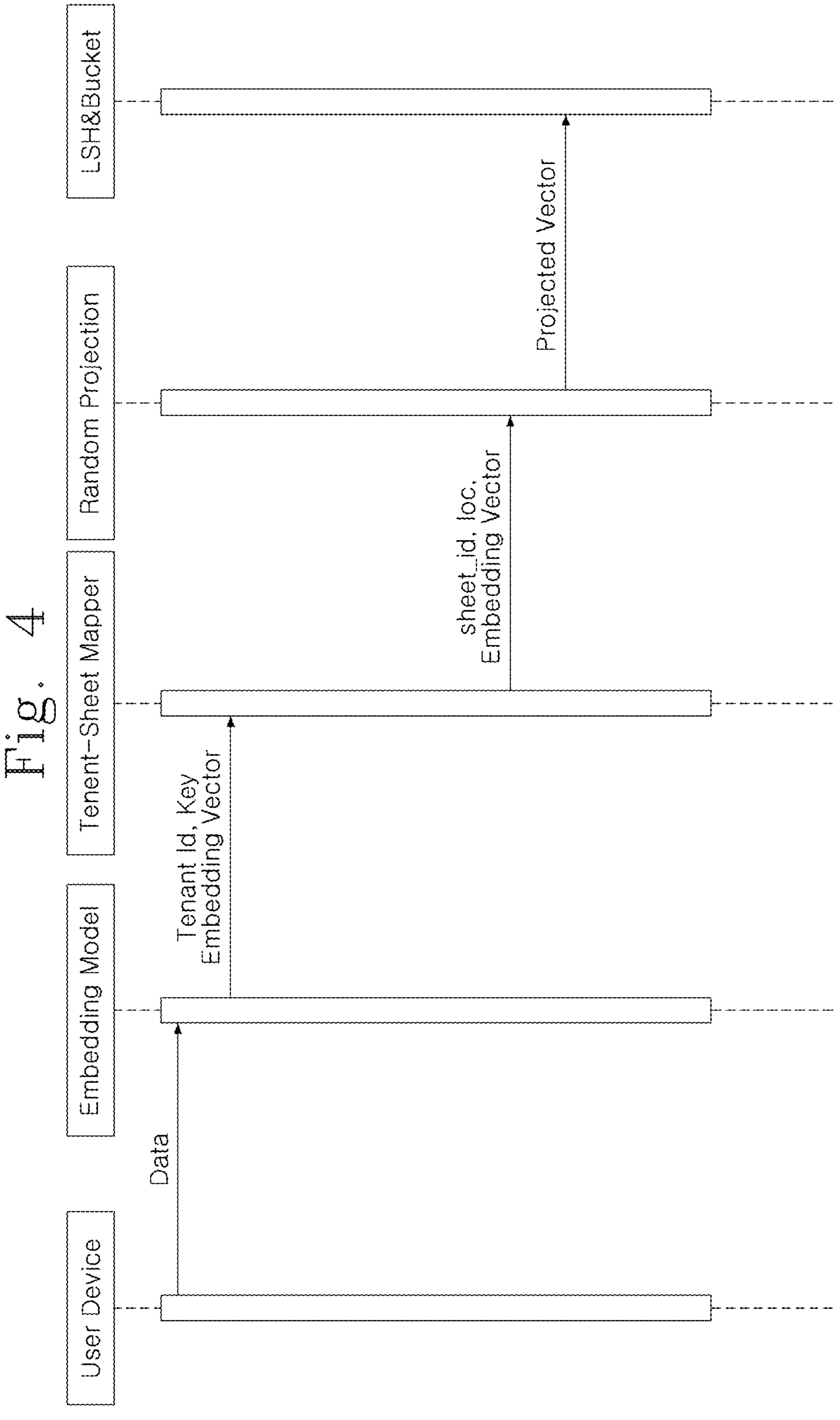
FIG. 4 is a signal flow diagram illustrating the process of storing an embedding vector for vector indexing according to an embodiment of the present disclosure.

FIG. 3 is a flowchart illustrating a method for storing an embedding vector for vector indexing according to an embodiment of the present disclosure, and FIG. 4 is a signal flow diagram illustrating a process for storing an embedding vector for vector indexing according to an embodiment of the present disclosure.

First, an embedding model receives data from a user terminal (in this case, tenant information such as a tenant ID or a tenant key may be received along with the data). The embedding model that has received the data converts the data into an embedding vector. A tenant-sheet mapper receives the embedding vector from the embedding model and verifies the embedding vector by using the tenant information (the tenant ID or the tenant key). In this case, the tenant information may be directly received from the user terminal or may be received via the embedding model. The tenant-sheet mapper verifies the embedding vector received from the embedding model by comparing a key, which the tenant-sheet mapper has, with the tenant key received from the user device (key pair comparison). After the verification, the tenant-sheet mapper maps tenants based on the tenant information to sheets (maps the tenants to the sheets, the projection sheets, and the distance sheets, predefined as shown in FIGS. 2A, 2B anc 2C). Then, a random projection module receives the embedding vector, a sheet ID (the ID of a sheet related to the tenant ID), the storage starting position for storing projection vectors (projection vectors related to the tenant ID), the number of projection vectors, and the number of buckets (buckets related to the tenant ID) to perform a projection operation (GEMV operation). As a result of this operation, the random projection module obtains a projected vector (indexed embedding vector), which is the result of performing the projection operation. Subsequently, an LSH module receives the projected vector and the tenant ID and allocates and stores the received projected vector (+the tenant ID) in a bucket. The LSH module reduces the dimension of the projected vector and groups projected vectors having high similarity into the same bucket (allocates projected vectors having high similarity to a bucket). By doing so, during vector indexing, a bucket matching the projected vector of the input embedding vector is obtained immediately, or a bucket containing a projected vector having high similarity to the projected vector of the input embedding vector may be identified immediately.

Figure 5:
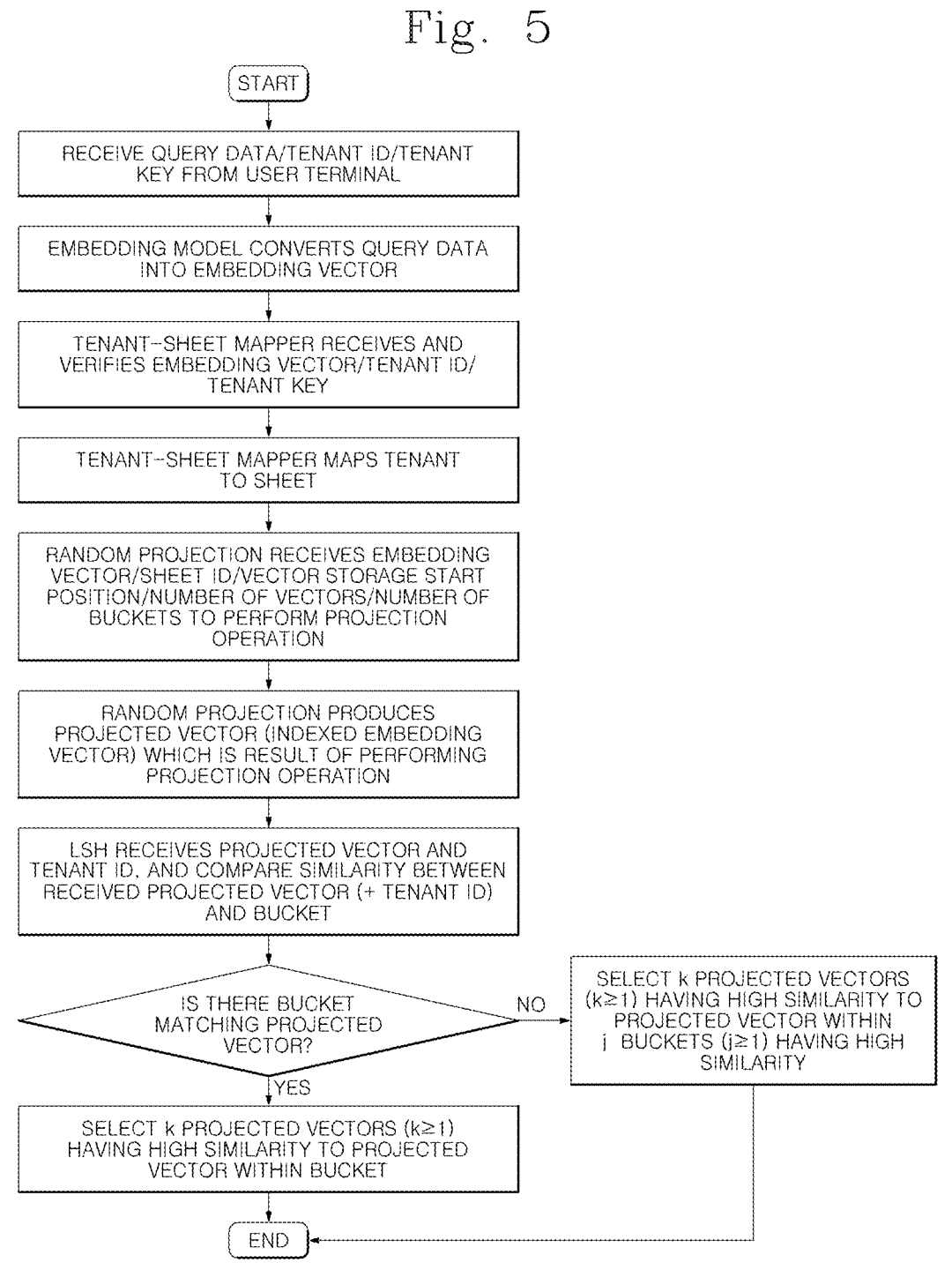
Figure 6:
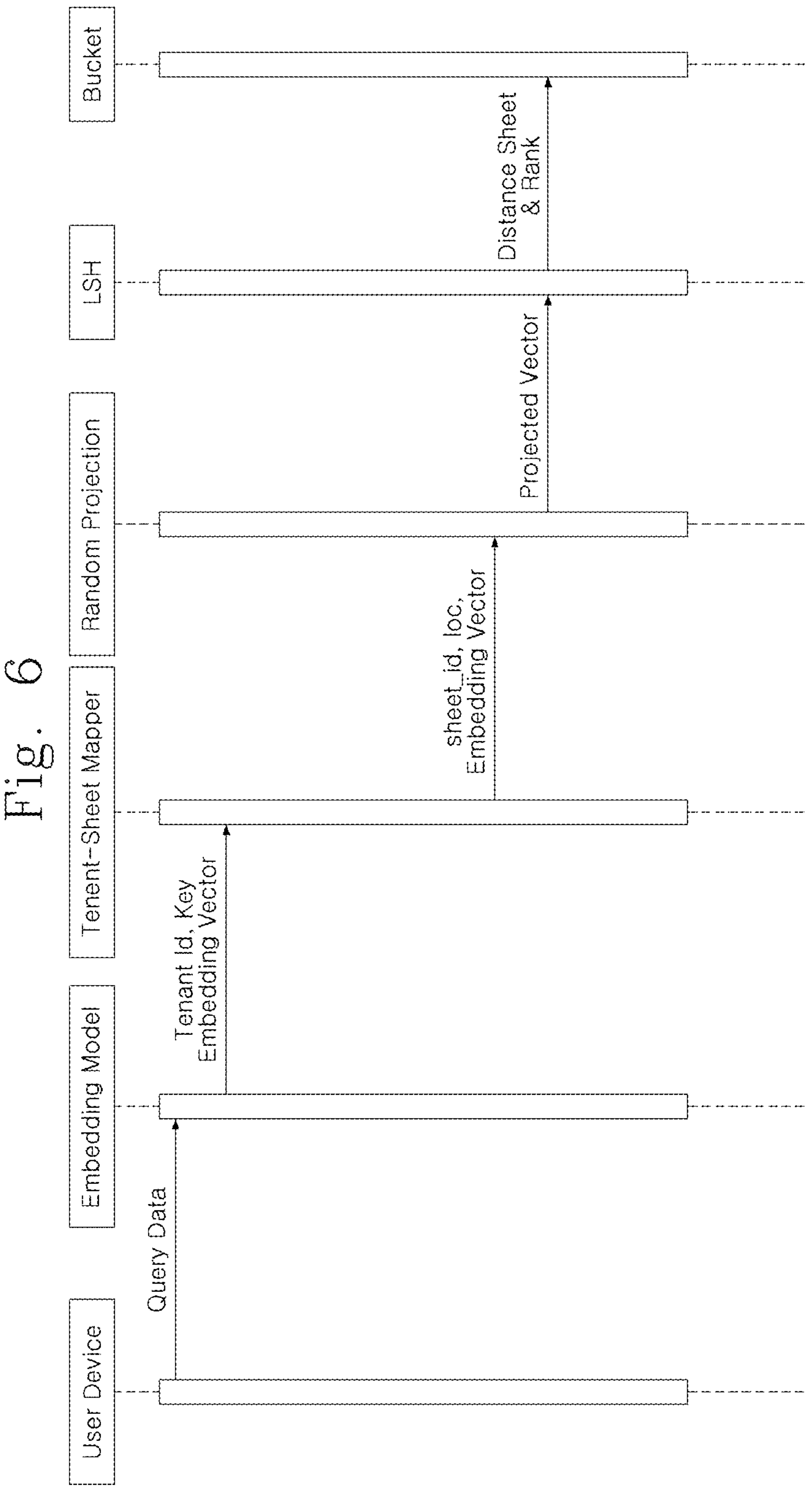
FIG. 6 is a signal flow diagram illustrating the process of obtaining an embedding vector by vector indexing according to an embodiment of the present disclosure.

FIG. 5 is a flowchart illustrating a method for obtaining an embedding vector by vector indexing according to an embodiment of the present disclosure, and FIG. 6 is a signal flow diagram illustrating a process for obtaining an embedding vector by vector indexing according to an embodiment of the present disclosure.

First, an embedding model receives data (query data) from a user device (in this case, tenant information such as a tenant ID or a tenant key may be received along with the data). The embedding model that has received the data converts the data into an embedding vector. A tenant-sheet mapper receives the embedding vector from the embedding model and verifies the embedding vector by using the tenant information (the tenant ID or the tenant key). In this case, the tenant information may be directly received from the user terminal or may be received via the embedding model. A tenant-sheet mapper verifies the embedding vector received from the embedding model by comparing a key, which the tenant-sheet mapper has, with the tenant key received from the user device (key pair comparison). After the verification, the tenant-sheet mapper maps tenants identified by the tenant information to sheets (maps tenants to the sheets, the projection sheets, and the distance sheets, predefined as shown in FIGS. 2A, 2B and 2C). Then, a random projection module receives the embedding vector, a sheet ID (the ID of a sheet related to the tenant ID), the storage starting position of a projection vector (a projection vector related to the tenant ID), the number of projection vectors, and the number of buckets (buckets associated with the tenant ID) to perform a projection operation. As a result of this operation, the random projection module obtains a projected vector (indexed embedding vector), which is the result of performing the projection operation. Subsequently, an LSH module receives the projected vector and the tenant ID, and transmits the received projected vector (+the tenant ID) to a bucket (it is also possible to compare only the similarity between the projected vector and the bucket (or a projected vector within the bucket) without transmitting the projected vector to the bucket). The LSH module reduces the dimension of the projected vector and groups projected vector having high similarity into the same bucket (allocates projected vector having high similarity to a bucket). By doing so, during vector indexing, a bucket matching the projected vector of the input embedding vector may be immediately obtained, or a bucket containing a projected vector having high similarity to the projected vector of the input embedding vector may be immediately identified. When there is a bucket matching the projected vector having the reduced dimension, the LSH module transmits the projected vector to the bucket (the LSH module may compare only the similarity between the projected vector and the bucket (or a projected vector in the bucket) without transmitting the projected vector to the bucket), and the bucket completes vector indexing by selecting at least one projected vector in the bucket having high similarity to the projected vector (e.g., selecting top k vectors in terms of similarity) (in this case, one or more (k) projected vectors in the bucket having high similarity may be selected). When there is no bucket matching the projected vector having the reduced dimension, the LSH module selects a bucket having the highest similarity from among buckets (in this case, one or more (j) buckets having the highest similarity may be selected). Then, the LSH module transmits the projected vector to the selected bucket (the LSH module may also compare, without transmitting the Projected vector to the bucket, only the similarity of the projected vector and the bucket (or a projected vector within the bucket), and the selected bucket completes vector indexing by selecting at least one projected vector within the bucket having high similarity to the projected vector (in this case, one or more (k) projected vectors within the bucket having high similarity may be selected).

Figure 7:
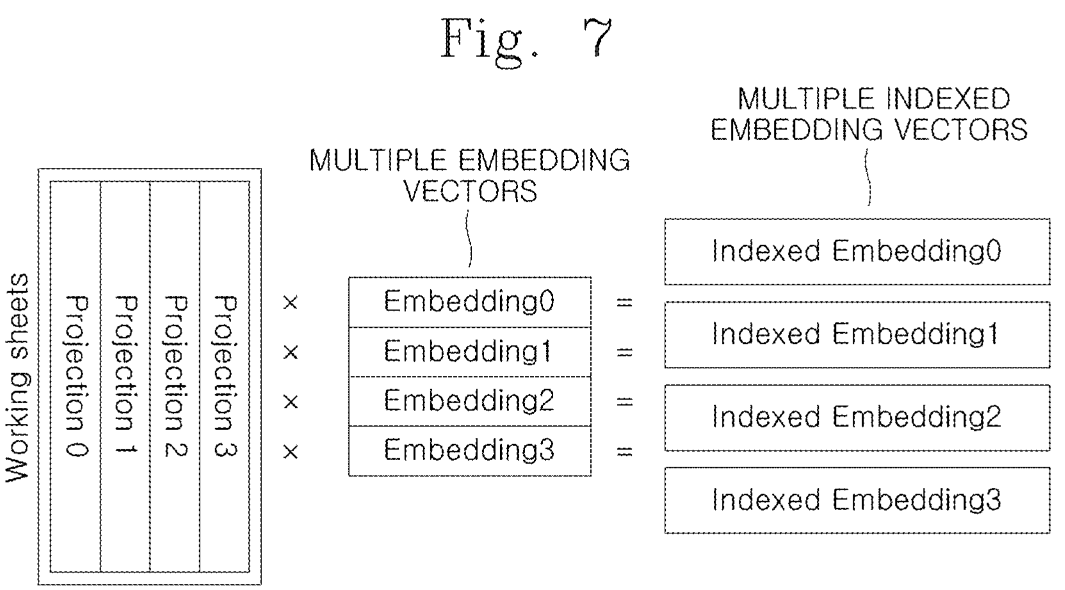
FIG. 7 is a schematic diagram illustrating the sheet partitioning structure of PIM for responding to multiple embedding vectors due to multiple queries according to an embodiment of the present disclosure.

FIG. 7 is a schematic diagram illustrating the sheet partitioning structure of PIM for responding to multiple embedding vectors due to multiple queries according to an embodiment of the present disclosure.

Projection vectors are collected to define working sheets, enabling simultaneous calculation of multiple embedding vectors. The sheets may be divided according to the batch size (the allowed size of multiple queries), with projection vectors allocated, thereby enabling multiple embedding vectors to be processed simultaneously in a single PIM GEMV operation. According to this sheet partitioning structure, four random projection vectors may be processed at once, as shown in FIG. 7. The above method may define the allowable size of multiple queries, convert projection sheets and distance sheets to working sheets through batch scheduling (batch processing), and using the working sheets for a projection operation in a random projection module and bucket allocation in an LSH module, thereby improving PIM parallel performance.

Figure 8:
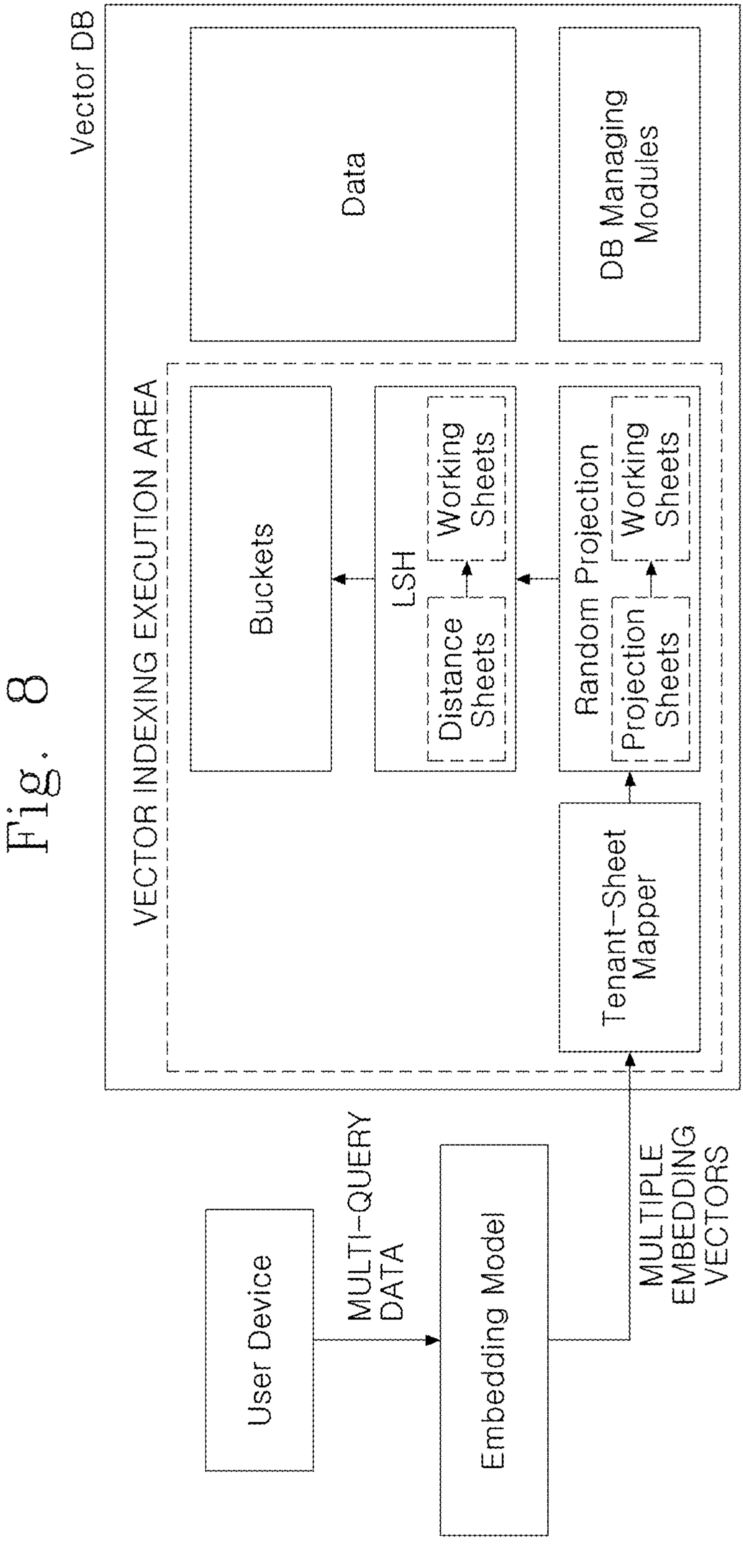
FIG. 8 is a schematic diagram illustrating a vector DB that performs vector indexing using the sheet partitioning structure of PIM for responding to multiple embedding vectors due to multiple queries according to an embodiment of the present disclosure.

FIG. 8 is a schematic diagram illustrating a vector DB for performing vector indexing using the sheet partitioning structure of PIM for responding to multiple embedding vectors due to multiple queries according to an embodiment of the present disclosure.

As shown in FIG. 8, the contents of projection sheets and distance sheets are copied/pasted into working sheets as needed, so PIM operations such as a projection operation in a random projection module and bucket allocation in an LSH module are performed using data in the working sheets (in this case, working sheets for batch processing may be pre-partitioned).

Device to which the Proposed Method of the Present Disclosure can be Applied

Figure 9:
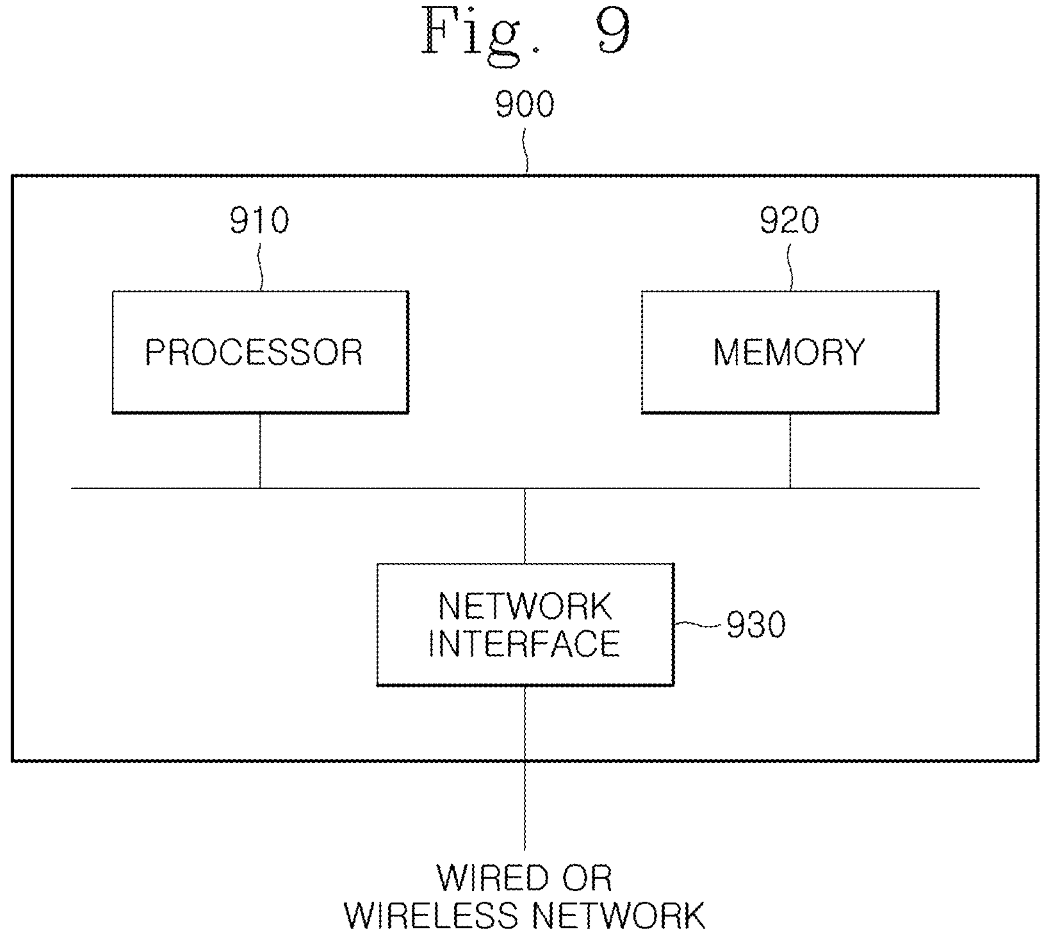
FIG. 9 illustrates a device to which the proposed method of the present disclosure can be applied.

FIG. 9 illustrates a device 900 to which the proposed method of the present disclosure may be applied. The device 900 may be a server or a terminal for accelerating vector indexing by using PIM.

Referring to FIG. 9, the device 900 may be a server device or a terminal device configured to implement a process for a method for accelerating vector indexing by using PIM.

For example, the device 900 to which the proposed methods of the present disclosure may be applied may include a network device such as a repeater, a hub, a bridge, a switch, a router, or a gateway, a computer device such as a desktop computer or a workstation, a mobile terminal such as a smartphone, a portable device such as a laptop computer, house electric appliances such as digital televisions, a movement means such as an automobile, and the like. In another example, the device 1200 to which the present disclosure may be applied may be included as part of an application specific integrated circuit (ASIC) implemented in the form of a system on chip (SoC).

A memory 920 may be operatively connected to a processor 910, may store programs and/or instructions for processing and control performed by the processor 910, and may store data and information used in the present disclosure, control information required for processing the data and the information according to the present disclosure, temporary data generated during processing of the data and the information, and the like. The memory 920 may be implemented as a storage device such as read-only memory (ROM), random-access memory (RAM), erasable programmable read-only memory (EPROM), electrically erasable programmable read-only memory (EEPROM), flash memory, static RAM (SRAM), a hard disk drive (HDD), a solid-state drive (SSD), or the like.

The processor 910 may be operatively connected to the memory 920 and a network interface 930, and controls the operation of each module within the device 900. In particular, the processor 910 may perform various control functions for performing the proposed method of the present disclosure. The processor 910 may also be referred to as a controller, a microcontroller, a microprocessor, a microcomputer, etc. The proposed method of the present disclosure may be implemented using hardware, firmware, software, or a combination thereof. When the present disclosure is implemented using hardware, the processor 910 may include an application specific integrated circuit (ASIC), a digital signal processor (DSP), a digital signal processing device (DSPD), a programmable logic device (PLD), a field programmable gate array (FPGA), or the like configured to perform the present disclosure. Meanwhile, when the proposed method of the present disclosure is implemented using firmware or software, the firmware or the software may include instructions that are related to a module, a procedure, or a function for performing functions or operations necessary for implementing the proposed method of the present disclosure. The instructions may be stored in memory 920 or on a computer-readable recording medium (not shown) separate from the memory 920. The instructions may be configured to, when executed by the processor 910, cause the device 900 to implement the proposed method of the present disclosure.

Furthermore, the device 900 may include the network interface device 930. The network interface device 930 may be operatively connected to the processor 910, and the processor 910 may control the network interface device 930 to transmit or receive wireless/wired signals carrying information and/or data, signals, messages, etc. over a wireless/wired network. The network interface device 930 supports various communication standards, such as IEEE 802 series, 3GPP LTE (-A), and 3GPP 5G, and may transmit and receive control information and/or data signals in accordance with the communication standards. The network interface device 930 may also be implemented outside the device 900 as needed.

The above embodiments and drawings described in the present specification are merely illustrative and are not intended to limit the scope of the present disclosure in any way. Furthermore, connection members or connections of lines between components shown in the drawings are merely illustrative of functional connections and/or physical or circuit connections, and may be represented by various alternative or additional functional, physical, or circuit connections in an actual device. Furthermore, unless specifically stated with terms "essential," or "important," the components may not necessarily be required for the application of the present disclosure.

In the specification (particularly, in the claims) of the present disclosure, the use of the term "the" and similar indicative terms may refer to both singular and plural forms. Furthermore, when a range is stated in the present disclosure, this is intended to include inventions that apply individual values within the range (unless otherwise stated), and this is equivalent to stating each individual value constituting the range in the detailed description of the disclosure. Furthermore, the operations presented in the method invention of the present disclosure are not intended to be restrictive with respect to the order of execution of the operations, and the order may be appropriately changed as needed, unless the nature of each process requires that a specific operation necessarily precede another operation. In the present disclosure, the use of any examples or exemplary terms (e.g., etc.) is merely for the purpose of describing the present disclosure in detail, and unless limited by the claims, the scope of the present disclosure is not limited by such examples or exemplary terms. Furthermore, it will be understood by those skilled in the art that various modifications, combinations, and changes may be made based on design conditions and elements, within the appended claims or equivalents thereof.

What is claimed is:

1. A method for accelerating vector indexing by using PIM, the method comprising:

receiving at least one embedding vector and at least one piece of tenant information;

mapping a tenant area determined by the tenant information to a sheet;

obtaining a first projected vector by performing, based on the sheet, a projection operation on the embedding vector;

comparing similarity between the first projected vector and at least one bucket, based on the sheet; and selecting, based on the similarity comparison result, at least one second projected vector having relatively high similarity to the first projected vector within the bucket, wherein the sheet is a unit grouping a predetermined number of memory channels in a memory area of a PIM-enabled memory device.

2. The method of claim 1, wherein the tenant information comprises at least one of a tenant ID and a tenant key.

3. The method of claim 1, wherein the sheet is a projection sheet or a distance sheet, and wherein the projection operation is performed in parallel across the predetermined number of memory channels within the sheet.

4. The method of claim 3, wherein the projection sheet is formed as a unit in which a memory area is divided into a predetermined number of memory channels, the projection sheet comprises a predetermined number of tenant areas, and each tenant area comprises a predetermined number of projection vectors.

5. The method of claim 4, wherein the projection vectors are operands configured to reduce a dimension or complexity of the embedding vector through the projection operation.

6. The method of claim 3, wherein the distance sheet is formed as a unit in which a memory area is divided into a predetermined number of memory channels, is allocated to each tenant, and comprises at least one second projected vector for each of the at least one bucket.

7. The method of claim 1, wherein the first projected vector is an operation result vector in which the dimension or complexity of the embedding vector has been reduced through the projection operation, and the second projected vector is an operation result vector in which the dimension or complexity of the embedding vector has been reduced, and is a vector stored in each bucket.

8. The method of claim 1, wherein the bucket is formed by branching a projected vector through an LSH module.

9. The method of claim 1, wherein the selecting of the second projected vector comprises selecting the at least one second projected vector having high similarity to the first projected vector within the bucket in case that there is a bucket matching the first projected vector as a result of the similarity comparison.

10. The method of claim 1, wherein the selecting of the second projected vector comprises selecting a bucket having highest similarity from among the at least one bucket in case that there is no bucket matching the first projected vector as a result of the similarity comparison, and selecting the at least one second projected vector having high similarity to the first projected vector within the selected bucket.

11. A computer program stored in a medium to execute, in combination with hardware, the method for accelerating vector indexing by using PIM in claim 1.

12. A device for accelerating vector indexing by using PIM, the device comprising a processor, wherein the processor is configured to:

receive at least one embedding vector and at least one piece of tenant information;

map a tenant area determined by the tenant information to a sheet;

obtain a first projected vector by performing, based on the sheet, a projection operation on the embedding vector;

compare, based on the sheet, similarity between the first projected vector and at least one bucket; and select, based on the similarity comparison result, at least one second projected vector having relatively high similarity to the first projected vector within the bucket, wherein the sheet is a unit grouping a predetermined number of memory channels in a memory area of a PIM-enabled memory device.

13. The device of claim 12, wherein the tenant information comprises at least one of a tenant ID and a tenant key.

14. The device of claim 12, wherein the sheet is a projection sheet or a distance sheet, and wherein the projection operation is performed in parallel across the predetermined number of memory channels within the sheet.

15. The device of claim 14, wherein the projection sheet is formed as a unit in which a memory area is divided into a predetermined number of memory channels, the projection sheet comprises a predetermined number of tenant areas, and each tenant area comprises a predetermined number of projection vectors.

16. The device of claim 15, wherein the projection vectors are operands configured to reduce a dimension or complexity of the embedding vector through the projection operation.

17. The device of claim 14, wherein the distance sheet is formed as a unit in which a memory area is divided into a predetermined number of memory channels, is allocated to each tenant, and comprises at least one second projected vector for each of the at least one bucket.

18. The device of claim 12, wherein the first projected vector is an operation result vector in which the dimension or complexity of the embedding vector has been reduced through the projection operation, and the second projected vector is an operation result vector in which the dimension or complexity of the embedding vector has been reduced, and is a vector stored in each bucket.

19. The device of claim 12, wherein the selecting of the second projected vector comprises selecting the at least one second projected vector having high similarity to the first projected vector within the bucket in case that there is a bucket matching the first projected vector as a result of the similarity comparison.

20. The device of claim 12, wherein the selecting of the second projected vector comprises selecting a bucket having highest similarity from among the at least one bucket in case that there is no bucket matching the first projected vector as a result of the similarity comparison, and selecting the at least one second projected vector having high similarity to the first projected vector within the selected bucket.

* * * * *